(12) United States Patent
Haluptzok et al.

(10) Patent No.: US 7,370,275 B2
(45) Date of Patent: May 6, 2008

(54) SYSTEM AND METHOD FOR PROVIDING CONTEXT TO AN INPUT METHOD BY TAGGING EXISTING APPLICATIONS

(75) Inventors: Patrick Haluptzok, Sammamish, WA (US); Yutaka Suzue, Issaquah, WA (US); Angshuman Guha, Woodinville, WA (US); Anuradha N. Padte, Redmond, WA (US); Vamshidhar G. Reddy, Redmond, WA (US); Mukundan Bhoovaraghavan, Hyderabad (IN); Ranjit Kumar Gupta, Hyderabad (IN); Joshua A. Clow, Bellevue, WA (US); Robert Lewis Chambers, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 10/850,844

(22) Filed: May 21, 2004

(65) Prior Publication Data
US 2005/0091032 A1 Apr. 28, 2005

Related U.S. Application Data

(62) Division of application No. 10/693,330, filed on Oct. 24, 2003.

(51) Int. Cl.
*G06F 17/00* (2006.01)
*G06F 17/28* (2006.01)
*G06F 9/44* (2006.01)

(52) U.S. Cl. ............... 715/536; 715/526; 715/831; 704/4; 704/231; 717/163

(58) Field of Classification Search ............. 715/526, 715/536, 831, 857; 704/4, 9, 231, 235, 270, 704/275; 382/181, 186; 717/163
See application file for complete search history.

(56) References Cited

U.S. PATENT DOCUMENTS 5,513,278 A 4/1996 Hashizume et al.
(Continued)

FOREIGN PATENT DOCUMENTS

EP 0565872 A2 * 10/1993
(Continued)

OTHER PUBLICATIONS

Citrin et al., "Distributed Architectures for Pen-Based Input and Diagram Recognition," ACM Conference on Advanced Visual Interface '96.*
(Continued)

*Primary Examiner*—William Bashore
*Assistant Examiner*—MaiKhanh Nguyen
(74) *Attorney, Agent, or Firm*—Workman Nydegger

(57) ABSTRACT

An improved system and method for providing context information of executable code to an input method is provided. Advanced text input methods may be made aware of the type of text expected to be received as input so that input methods may achieve a higher accuracy in recognition of text input. Generic interfaces provide a framework for supporting application authoring platforms to allow application developers to easily specify context information to the system and have it reliably forwarded to the correct input methods. Additionally, a context tagging tool may associate specific text input fields of an existing application with an input scope without modifying the application itself. The context tagging tool may create a manifest that contains tags associating the specific text input fields with an input scope. Any advanced input methods use by the application may be updated with instructions for accessing the context information stored in the manifest.

18 Claims, 10 Drawing Sheets

U.S. PATENT DOCUMENTS

| | | | |
|---|---|---|---|
| 6,167,376 A | 12/2000 | Ditzik | |
| 6,233,559 B1 | 5/2001 | Balakrishnan | |
| 6,359,572 B1* | 3/2002 | Vale | 341/23 |
| 6,401,067 B2 | 6/2002 | Lewis et al. | |
| 6,438,523 B1 | 8/2002 | Oberteuffer et al. | |
| 6,456,978 B1 | 9/2002 | Wymore et al. | |
| 6,552,719 B2* | 4/2003 | Lui et al. | 345/179 |
| 6,581,033 B1* | 6/2003 | Reynar et al. | 704/231 |
| 6,594,390 B2 | 7/2003 | Frink et al. | |
| 6,654,955 B1 | 11/2003 | Kusnitz et al. | |
| 6,788,815 B2 | 9/2004 | Lui et al. | |
| 6,819,315 B2* | 11/2004 | Toepke et al. | 345/173 |
| 6,970,599 B2* | 11/2005 | Longe et al. | 382/185 |
| 7,031,907 B1 | 4/2006 | Passaretti et al. | |
| 2002/0103881 A1* | 8/2002 | Granade et al. | 709/218 |
| 2002/0120647 A1* | 8/2002 | Amano | 707/501.1 |
| 2002/0178008 A1* | 11/2002 | Reynar | 704/272 |
| 2002/0198909 A1* | 12/2002 | Huynh et al. | 707/513 |
| 2003/0071850 A1* | 4/2003 | Geidl | 345/781 |
| 2003/0189603 A1 | 10/2003 | Goyal et al. | |
| 2004/0044422 A1* | 3/2004 | Fux et al. | 700/17 |
| 2004/0111259 A1 | 6/2004 | Miller et al. | |
| 2004/0243415 A1* | 12/2004 | Commarford et al. | 704/275 |

FOREIGN PATENT DOCUMENTS

| | | |
|---|---|---|
| EP | 0689155 A2 * | 12/1995 |
| EP | 1077404 | 2/2001 |
| EP | 1143334 | 10/2001 |

OTHER PUBLICATIONS

Office Action mailed Jun. 21, 2007, cited in related application, U.S. Appl. No. 10/693,330 (Attached as Document 3).

EP Search Report, completed Jun. 22, 2007, EP Application No. 04021626, 2 pages (Attached as Document 4).

* cited by examiner

SYSTEM AND METHOD FOR PROVIDING CONTEXT TO AN INPUT METHOD BY TAGGING EXISTING APPLICATIONS

CROSS-REFERENCE TO RELATED APPLICATION

This application is a divisional of copending U.S. patent application Ser. No. 10/693,330, filed Oct. 24, 2003.

FIELD OF THE INVENTION

The invention relates generally to computer systems, and more particularly to an improved system and method for providing context to an input method.

BACKGROUND OF THE INVENTION

Advanced text input methods such as handwriting, speech, and Input Method Editors (IMEs) are often limited to leveraging language rules and a language dictionary as the primary forms of context used to achieve accuracy in recognition of text input. Contextual information such as unigrams or n-grams has been traditionally provided as part of the language model to such input methods to increase accuracy in recognition of natural language input. Unfortunately, some of the most common fields of applications and of forms expect input that may not conform to the language rules of a specific language and may not even conform to the vocabulary of a specific language. For example, an email field may expect an email address as input. Most, if not all, email addresses do not conform to the language rules or vocabulary of a specific language. English language rules which require, for example, a space between words do not apply to an email address. Similarly, a field may expect a Uniform Resource Locator (URL), which also may not conform to the language rules or vocabulary of a specific language. As a result, such input methods may be severely limited in their ability to accurately recognize input for these types of fields. Users consequently may have an unsatisfactory experience when using such input methods that result in poor recognition accuracy for these types of fields.

Furthermore, in applications where the vocabulary may be restricted, such as in command and control applications, the context has been traditionally constrained by restricting the dictionary of the language to fewer words. However, this technique has been limited in its use by a single application for a specific input method. Multiple input methods could not use this technique for-constraining context without implementing the technique for each separate input method.

What is needed is a way for advanced text input methods to be made aware of the type of text expected to be received as input so that higher accuracy in recognition of text input may be achieved. Additionally, such a system should allow any input method to use the context provided by an application so that the user may switch between input methods to input the information for the field.

SUMMARY OF THE INVENTION

Briefly, the present invention provides an improved system and method for providing context information of executable code to an input method. Advanced text input methods may be made aware of the type of text expected to be received as input so that such input methods may achieve a higher accuracy in recognition of text input. To this end, an architecture is provided with a generic interface for supplying context information so that applications can provide input scope for any of their fields expecting text input. Furthermore, any input method may use the context information provided by an application. Consequently, users may switch between input methods to input information to the application without loss of the context information.

The present invention additionally provides a system of components including a context component with generic interfaces and a context tagging utility. The generic interfaces provide a framework for supporting application authoring platforms to allow application developers to easily specify context information to the system and have it reliably forwarded to the correct input methods. Such context information may include a common input scope, a set of input scopes, a word or phrase list, a custom input scope defined by a regular expression or other grammar.

In addition to providing a system and method for development of new applications, the present invention may also support existing applications without needing to modify the application itself by providing a context tagging tool for associating specific text input fields of an application with an input scope. The context tagging tool may create a manifest that contains tags associating the specific text input fields with an input scope. Such a manifest may be stored along with the program files. Any advanced input methods use by the application may be updated with instructions for accessing the context information stored in the manifest. Thus, existing applications may also benefit from use of the present invention for increasing accuracy of recognition for text input fields by advanced input methods.

Advantageously, the context tagging tool includes a user interface for tagging text input fields or controls of an existing application or executable code with an input scope. The user interface allows a text input field or control and an input scope to be selected, and their resulting association to be added to the manifest. Additionally, the user interface may include a phrase list editor and a custom input scope editor for creating, editing and managing a phrase list and a custom input scope respectively.

Other advantages will become apparent from the following detailed description when taken in conjunction with the drawings, in which:

DETAILED DESCRIPTION

Exemplary Operating Environment

Figure 1:
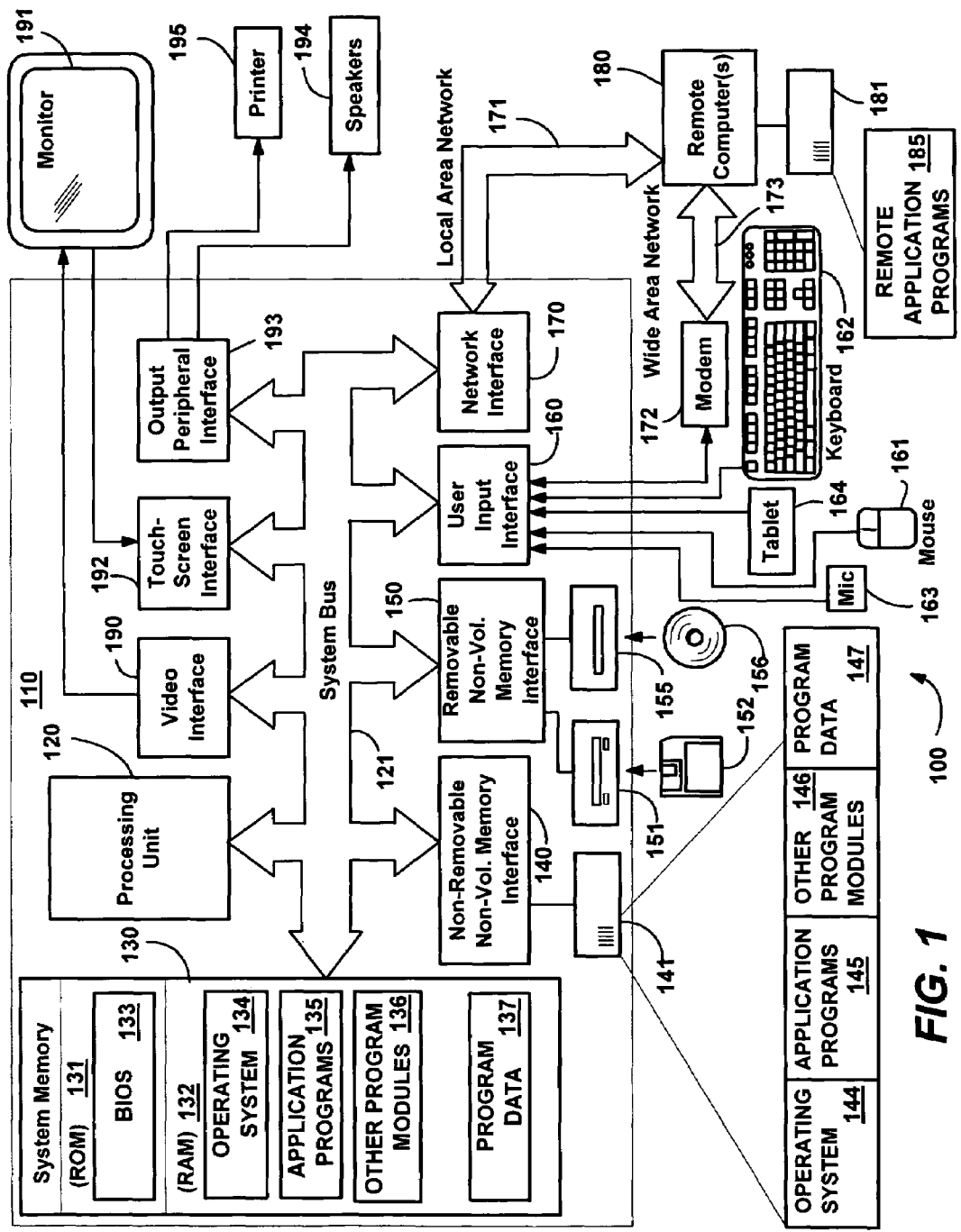
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Providing Context to an Input Method

The present invention is generally directed towards a method and system for providing context information of executable code to an input method. As used herein, context information generally means an input scope. An input scope is a subset of a language that is used to define what words, numbers, and punctuation can be written and may also specify in what order they may be written. An input scope can be used by applications to restrict the language model used by a recognizer of an input method to the type of text input an application is expecting in a text field. As will be seen, the invention may enable advanced input methods to achieve a higher accuracy recognition rate for text input to application fields by providing an architecture that supports applications or forms to specify what type of text input they are expecting in their text fields. Many text input fields in forms and dialogs are strongly typed, like the fields in a web order form or in a dialog window for updating personal contacts. The information about the type of text expected can greatly improve accuracy when specified to the recognition engines of the advanced input methods.

The architecture of the present invention allows applications that expect text input to fields or forms to provide this context information in a general way without interacting directly with the advanced input methods. To this end, the architecture provides a generic interface for supplying context information so that applications can provide input scope for any of their fields expecting text input. The system and method also provide a generic API to allow any input method to use the context information provided by the application to improve recognition accuracy. Furthermore, since any input method may use the context information provided by the application, a user may switch between input methods to input information to the application without loss of the context information. As will be understood, the various block diagrams, flow charts and scenarios described herein are only examples, and there are many other scenarios to which the present invention will apply.

Figure 2:
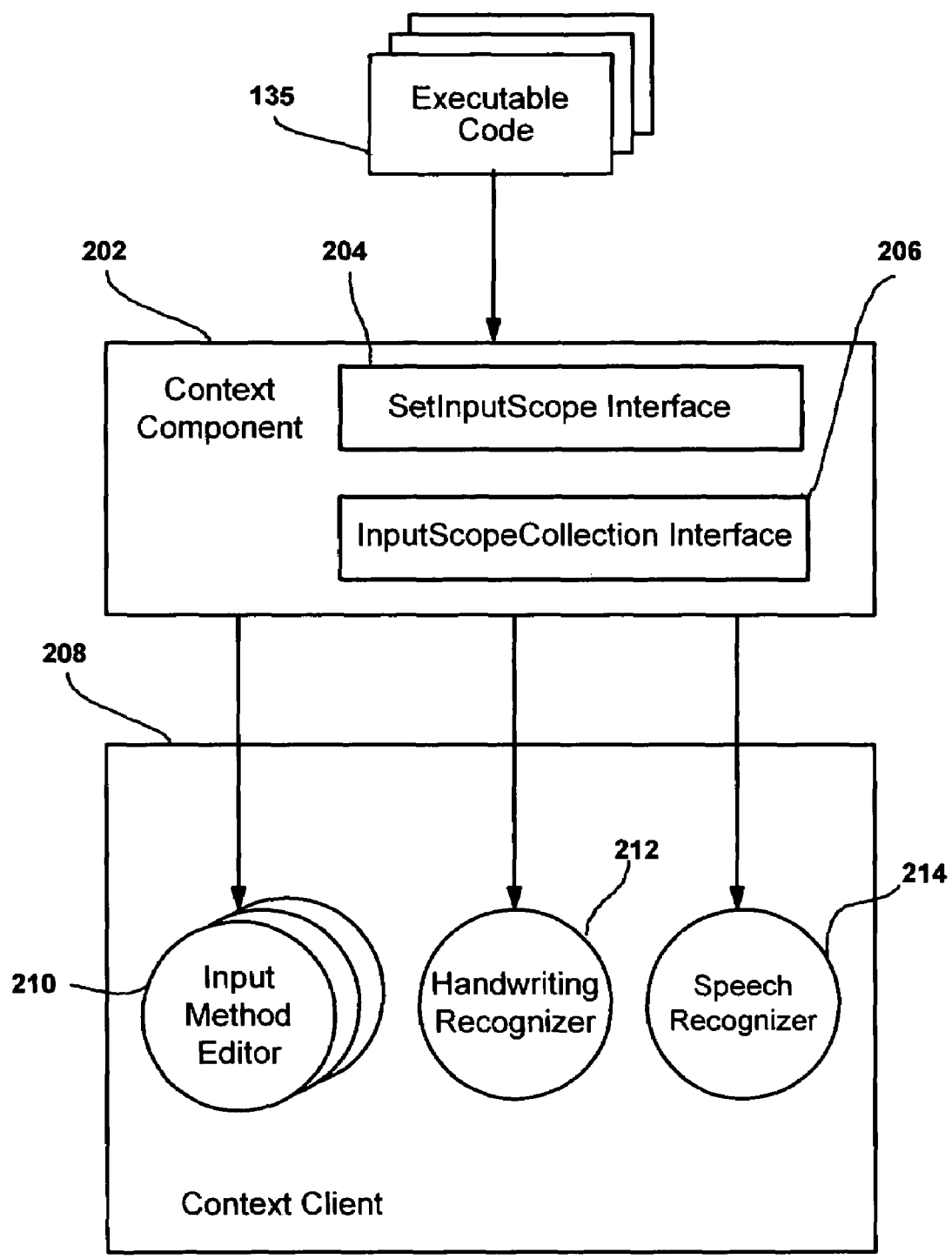
FIG. 2 is a block diagram generally representing an exemplary architecture of system components for providing context information of executable code to an input method, in accordance with an aspect of the present invention.

Turning to FIG. 2 of the drawings, there is shown a block diagram generally representing an exemplary architecture of system components for providing context information of executable code to an input method. Those skilled in the art will appreciate that the functionality implemented within the blocks illustrated in the diagram may be implemented as separate components or the functionality of several or all of the blocks may be implemented within a single component. For example, the functionality of the context component 202 may be included in the context client 208. Or the functionality for the InputScopeCollection interface in the context component 202 may be implemented in a separate component.

Any executable code 135 that expects text input to a field may provide context information for that field to a context component 202 by invoking an interface, such as SetInputScope Interface 204. The executable code 135 may be any type of executable software code such as a kernel component, an application program, a dialog box or form, a script, a linked library, a linked or embedded object, and so forth. The context component 202 includes an interface, such as a SetInputScope Interface 204, for setting an input scope of executable code 135, and also an interface, such as a InputScopeCollection Interface, for obtaining an input scope that has been set for a text input field of executable code 135.

The context component may be any executable software code including a kernel component, an application component, a component of a linked library, an object, and so forth. A context client 208 such as one or more Input Method Editors 210, a Handwriting Recognizer 212, a Speech Recognizer 214, or other recognizer of any additional type of input method, may query the InputScopeCollection interface 206 included as part of the context component 202 to obtain an input scope set for executable code 135. This architecture may allow applications or other executable code that expect text input to fields or forms to provide context of input scope in a general way without interacting directly with the advanced input methods.

The SetInputScope Interface 204 shown in FIG. 2 may be an API, an object, a control or other executable code. For example, in one embodiment the SetInputScope Interface 204 may be an API named "SetInputScope". In this embodiment, the SetInputScope API may associate a control or text input field with one common input scope or one wordlist. For example, the SetInputScope API may have the following programming language declaration:
  HRESULT SetInputScope(
  [in] HWND hwnd;
  [in] InputScope inputscope).

This API may expect a window handle and a pointer to a list of input scopes. This API may be used to set a common input scope defined by a parameter of type InputScope by invoking the API as SetInputScope (hwndMe, IS_URL), where IS_URL may be a parameter signifying an internally defined format with an associated fixed list of characters. Additionally, this API may be used to set a word list by passing the word list as a parameter of type InputScope by invoking the API as SetInputScope (hwndMe, {"male", "female"}).

In another embodiment, the SetInputScope Interface 204 may be an API named "SetInputScopes". In this embodiment, the SetInputScopes API may associate a control or text input field with one common input scope, multiple common input scopes, one word list, or one custom input scope. The custom input scope may be defined by a regular expression or any other way including a grammar like that specified in W3C Speech Recognition Grammar Specification (SRGS). For example, the SetInputScopes API may have the following programming language declaration:
  HRESULT SetInputScope(
  [in] HWND hwnd;
  [in] const InputScope *pInputScopes;
  [in] UINT cInputScopes;
  [in] WCHAR **ppszPhraseList;
  [in] UINT cPhrases;
  [in] WCHAR *pszRegExp;
  [in] WCHAR *pszSRGS).

This API may expect a window handle, a pointer to a list of input scopes, the number of input scopes in the list, a pointer to a phrase list, the number of phrases in the list, a regular expression defining an input scope, or a grammar such as SRGS defining an input scope. This API may be used to set several common input scopes passed by a parameter list of input scopes by invoking the API as SetInputScopes (hwndMe, {IS_DEFAULT, Is_PersonalName_FullName, IS_EMAIL_USERNAME, IS_EMAIL_SMTPEMAILADDRESS}, 4, NULL, NULL, NULL, NULL) where IS_DEFAULT, IS_PERSONALNAME_FULLNAME, IS_EMAIL_USERNAME, and IS_EMAIL_SMTPEMAILADDRESS may each signify an internally defined format with an associated fixed list of characters. Additionally, this API may be used to set a list of words or phrases by passing the list as a parameter of type InputScope by invoking the API as SetInputScopes (hwndMe, {IS_PHRASELIST, IS_DEFAULT}, 2, {"male", "female"}, 2, NULL, NULL). Additionally, this API may be used to set a custom scope of input defined by a regular expression, grammar, or other definition, such as by invoking the API as SetInputScopes (hwndMe, IS_SSN, 2, NULL, NULL, IS_DIGITS."-".IS_DIGITS."-".IS_DIGITS, NULL).

In either embodiment, such an API may support coercion of the input according to the definition of the input scope. Coercion means herein to constrain the recognition of the input to the definition of the input scope. In this case, a recognizer of an input method is constrained to conform to the exact definition of the input scope and may not use another definition of input scope. If coercion of the input is not specified, a recognizer of an input method may interpret the input scope specified as a recommendation, but may not constrain recognition to just that definition. In yet another embodiment, if a custom input scope definition conflicts with a common input scope or a wordlist, the definition of custom input scope may take precedence over the common input scope of wordlist.

The present invention is advantageously extensible so that additional APIs may be added. For instance, an input scope may be set using an API that defines an XML schema such as:
  HRESULT SetInputScopeXML(
  [in] HWND hwnd
  [in] WCHAR *pszXML).

The InputScopeCollection Interface 206 shown in FIG. 2 may be an API, an object, a control or other executable code. For example, in one embodiment the InputScopeCollection Interface 206 may be an object with methods that may be invoked by an input method for obtaining the input scope for a text input field specified by any executable code. In this exemplary embodiment, the recognizer of an input method may call a constructor of the object with a valid window handle for the application and then may access the public properties and may also call the public methods to access the different input scopes associated with the window handle for the application. The object may get a set of input scopes associated with a control, the individual input scopes from the set associated with the control, a regular expression from the set associated with the control, and a list of phrases from the set associated with the control. The class definition for an instance of such an object may be for example:
  Class Name
  public InputScopeCollection
  Public InputScopeCollection (IntPtr hWnd);
  Public bool HasInputScopes;
  Public int Count;
  Public InputScope [] InputScopes;
  Public string RegularExpression;
  Public string [] Phrases;
  methods
  public string Phrase(int index)
  public int InputScopes(int index)
  public string InputScopeEnumName(int index)
  public override string ToString()

The constructor "InputScopeCollection" may take a handle to a window and may find a set of input scopes that may be associated with it. The public property "HasInputScopes" may determine whether there is any input scope associated with the control. The public property "Count" may return the number of input scopes that may be associated with the control. The public property "InputScopes"

may return an array containing a set of input scopes that may be associated with the control. The public property "RegularExpression" may return a regular expression associated with the control. And the public property "Phrases" may return a string array containing the phrases associated with the control.

Any number of methods may be provided by an object that is an embodiment of the InputScopeCollection Interface 206 for obtaining the input scope for a text input field. For example, in the exemplary class definition of InputScope-Collection above, the method "Phrase(int index)" may return a phrase that is indexed by a requested index. The method "InputScopes(int index)" may return an input scope that is indexed by a requested index. The method "InputScopeEnumName(int index)" may return a name of an input scope at a specific location index. And the method "ToString ()" may return a string representation of an input scope for a specific instance. Those skilled in the art will appreciate that the interfaces represented in FIG. 2 are exemplary representations and that the present invention may be practiced using other interfaces defined for setting input scope and obtaining context information.

Figure 3:
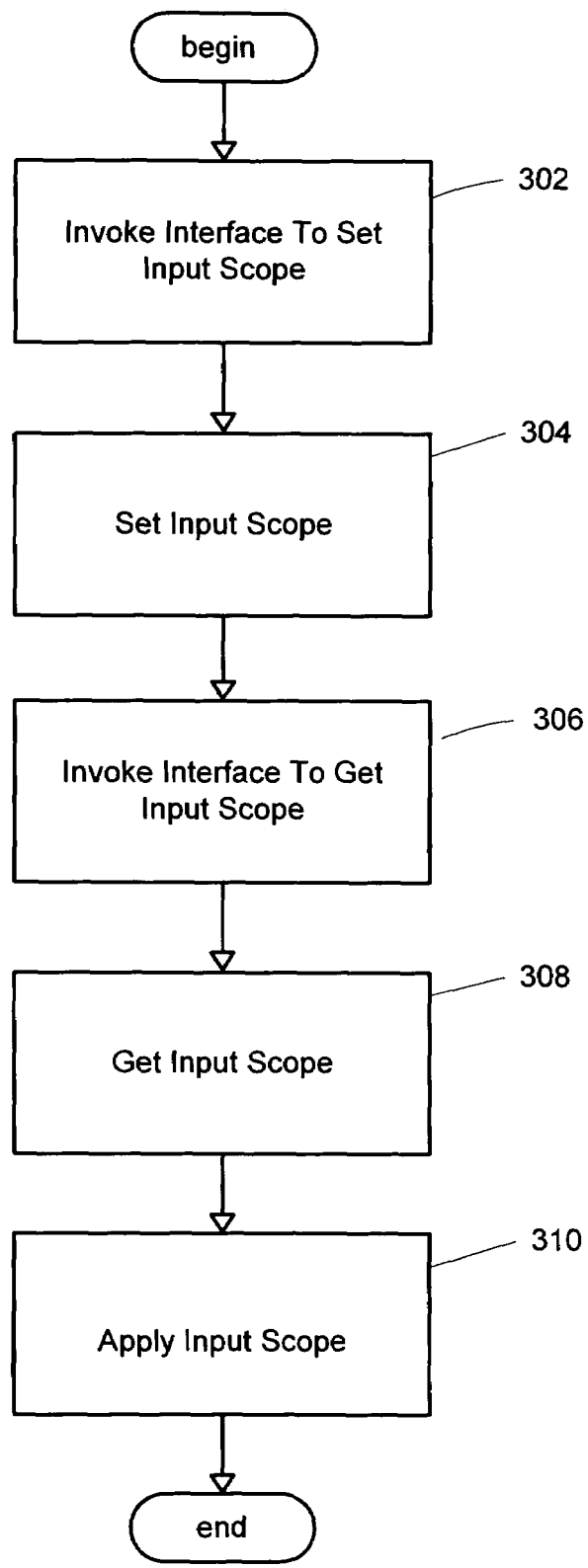
FIG. 3 is a flowchart generally representing example steps undertaken by the system for providing context information of executable code to an input method, in accordance with an aspect of the present invention.

FIG. 3 is a flowchart generally representing the steps undertaken by the system for providing context information of executable code to an input method. First, any executable code may invoke an interface for setting a scope of input for a text field at step 302. Included among the settings in an interface for a scope of input may be a list of input scopes, a list of words or phrases, a regular expression defining an input scope, or a grammar such as SRGS defining an input scope. Upon invoking such an interface, the input scope requested is set for a text field of executable code at step 304. The input scope may be stored in a temporary data structure or may be persisted on permanent storage. After the input scope is set, an interface may be invoked at step 306 to discover what input scopes were set and are available for use. For example, an advanced input method may discover whether there is any input scope set for a particular text field of executable code. At step 308, an input method may get an available input scope such as an individual input scope, a set of input scopes, a regular expression defining an input scope, or a list of words or phrases for that text field of executable code. Finally, the input scope obtained may be used at step 310 for recognizing input for the text field of the executable software code. By restricting the language model used by a recognizer of an input method to the type of text input expected by the executable code for the text field, higher accuracy for the recognition rate may be achieved.

A developer of executable code may use the present invention to tag text input fields of executable code to achieve a higher recognition rate by advanced input methods. For example, a developer may choose to create a Real Estate Request form designed for use with a tablet personal computer that recognizes handwriting to allow real estate agents to complete such a form using handwriting. During design and development of the executable code for this application, the developer may review the available interfaces of the present invention for setting input scope and the pre-defined formats of input scope for different types of text input fields. Upon discovering that there are available pre-defined formats suitable for text input fields, the developer may tag the input text fields and controls in the request form. The developer may be pleased to find that he can also easily combine predefined formats such as a format for the date and a format for the time for use by a "Date/Time" field. Additionally, the developer may find that he can add in a list for a given field. Note that the list may improve recognition for input into the given field and may also be used by a real estate agent to select an item from the displayed list for input into a field of the form. For any fields that may require a custom format of input scope, the developer may define such a custom input scope using a regular expression. For easy use and access by developers of such applications, the interfaces and predefined formats for input scope of the present invention may be packaged in a software development kit (SDK) or other form of distribution.

Context Tagging Tool for Providing Context to an Input Method

In another embodiment, the present invention may also provide a way for an application to supply context information for its specific text input fields without needing to modify the application itself. Such context information may be provided by using a context tagging utility so that existing applications may be able to benefit from use of the present invention for increasing accuracy of recognition for text input fields by advanced input methods. Context tagging as used herein means associating an input scope with a text input field or control of an application or executable code. In this embodiment, the context information tagged may be loaded for the existing applications and any advanced input methods used for input recognition may be updated for using the loaded context information. Advantageously, the existing application or executable code may be left unmodified but may still enjoy the benefit of the present invention by means external to the application or executable code.

In one embodiment for providing context information through external means, a manifest file may be created that may contain input scope information for the application or executable code. There may be a manifest file created in this embodiment by a context tagging tool for each application or executable code and each manifest file may be stored along with other program files of the application or executable code. The context tagging tool may be used in this embodiment to tag a specific text input field in executable code with an input scope. The tool may then create and write this mapping in turn into a manifest file. The tool may additionally ensure that the manifest file is stored in the right location for the specific application or executable code. Application developers may alternatively create this manifest file directly and may also edit a manifest file.

An advanced input method may be updated with instructions to look for a manifest file associated with the executable code and to look within the manifest file for an input scope associated with a specific text input field. Upon finding an input scope associated with a specific text input field, an advanced input method may read the context information and then pass the context information on to a recognizer for use in recognition of input by the advanced input method for the text input field.

Figure 4:
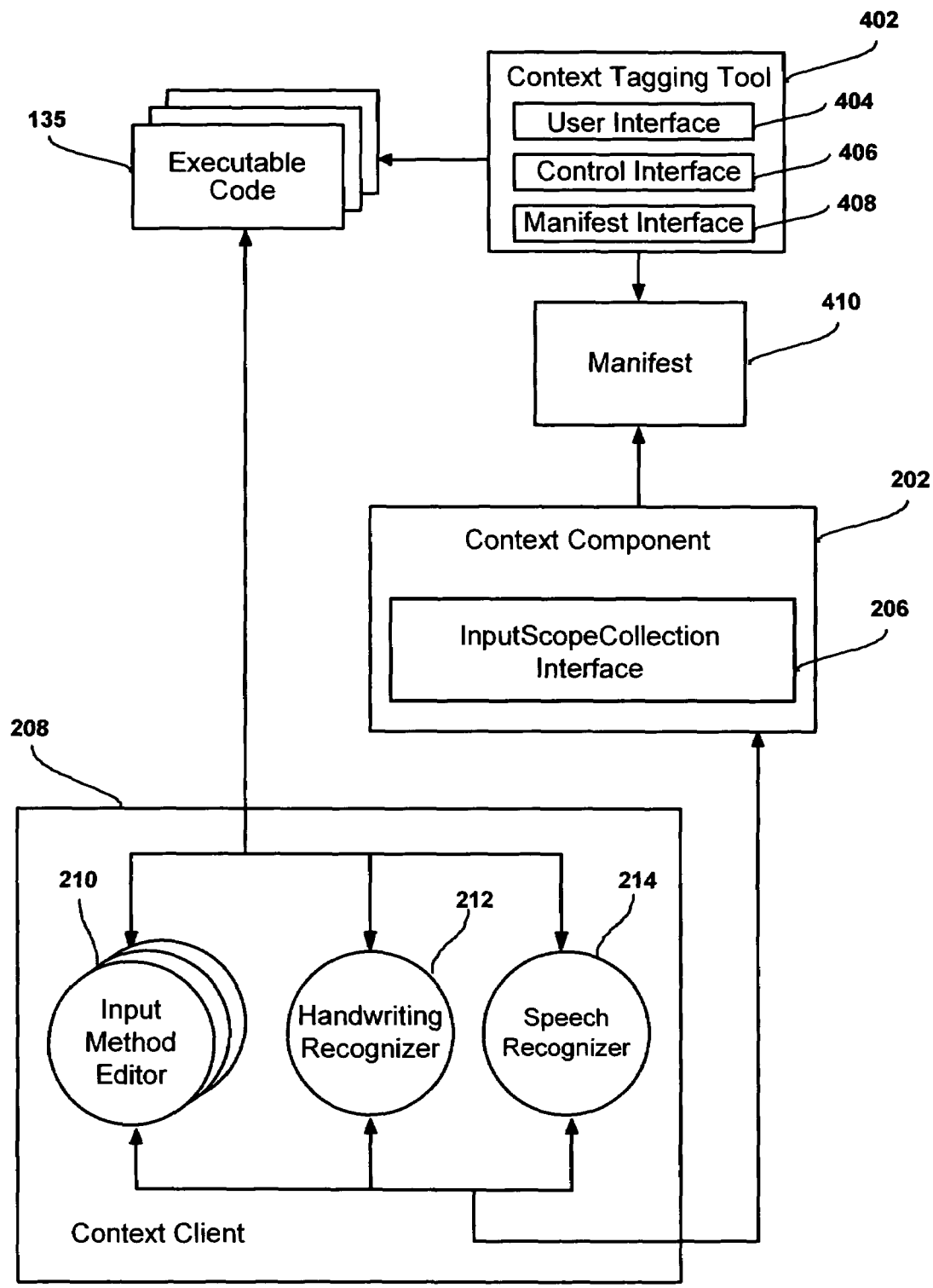
FIG. 4 is a block diagram generally representing an exemplary architecture of system components for providing context information of executable code to an input method using a context tagging utility, in accordance with an aspect of the present invention.

Turning to FIG. 4 of the drawings, there is shown a block diagram generally representing an exemplary architecture of system components for providing context information of executable code to an input method using a context tagging utility. Those skilled in the art will appreciate that the functionality implemented within the blocks illustrated in the diagram may be implemented as separate components or the functionality of several or all of the blocks may be implemented within a single component. For example, the functionality of the context component 202 may be included in the context client 208. Or part of the functionality for the manifest interface in the context tagging tool 402 may be implemented in a separate component.

Any executable code 135 that expects text input to a field may have context information for that field tagged by a context tagging tool 402. The context tagging tool 402 may be any type of executable software code such as a kernel component, an application program, a linked library, and so forth. The context tagging tool 402 may tag a specific text input field in executable code with an input scope. The context tagging tool 402 may include a user interface 404, a control interface 406, and a manifest interface 408. The user interface 404 may include a screen for selecting executable code to tag, a tag control screen, a select control screen, a screen to manage a phrase list, and a screen to manage custom input scope. The control interface 406 may include an interface, such as a SetInputScope Interface 204, for setting an input scope for a specific text input field of executable code 135. And the manifest interface 408 may create or open a manifest 410 and write the mapping of an input scope for a specific text input field into the manifest 410. The manifest interface 408 may additionally ensure that the manifest 410 is stored along with the program files for the specific application or executable code 135. The manifest 410 may be a file, such as an XML file, or other storage object that contains context information for a text input field. For example, an email name field may be defined as a URL input scope in a manifest 410. A context component 202 may access context information in the manifest 410 by invoking an interface, such as InputScopeCollection Interface 206. In this embodiment, the context component 202 includes an interface, such as an InputScopeCollection Interface 206, for accessing an input scope for a text input field of executable code 135 that is stored in the manifest 410. The context component may be any executable software code including a kernel component, an application component, a component of a linked library, an object, and so forth. A context client 208 such as one or more Input Method Editors 210, a Handwriting Recognizer 212, a Speech Recognizer 214, or other recognizer of any additional type of input method, may query the InputScopeCollection Interface 206 included as part of the context component 202 to obtain an input scope set for executable code 135. This architecture may allow an existing application or other executable code that expects text input to fields or forms to provide context of input scope in a general way without interacting directly with the advanced input methods and without requiring modification of the existing application or executable code.

Figure 5:
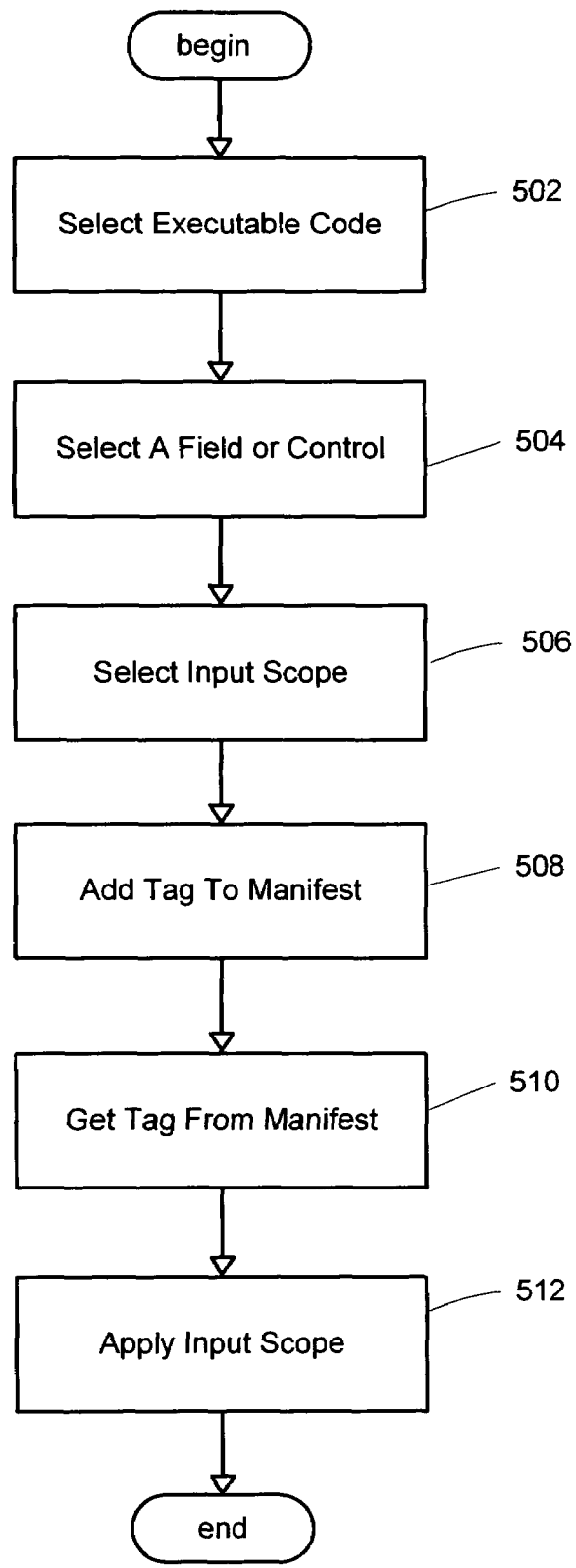
FIG. 5 is a flowchart generally representing example steps undertaken by the system for providing context information of executable code to an input method using a context tagging utility, in accordance with an aspect of the present invention.

FIG. 5 is a flowchart generally representing the steps undertaken by the system for providing context information of executable code to an input method using a context tagging utility. First, an application or executable code is selected for tagging its text input fields with an input scope at step 502. For this purpose, the context tagging tool 402 may be launched and an application or executable code 135 may be selected to have its text input fields tagged with an input scope. Next, a field or control of the executable code may be selected for tagging with an input scope at step 504. After the field or control is selected, an input scope may be selected at step 506 for associating with the field or control. The input scope selected may be a list of input scopes, a list of words or phrases, a regular expression defining an input scope, or a grammar such as SRGS defining an input scope. At step 508 a tag associating the selected field or control with the selected input scope is added to a manifest 410. After a field or control is tagged with an input scope and stored in the manifest, an advanced input method may obtain the tag associating a field or control with an input scope from the manifest. For example, an advanced input method may query the InputScopeCollection Interface 206 included as part of the context component 202 to obtain the tag from the manifest. Finally, the input scope obtained may be applied at step 512 for recognizing input for the text field of the executable software code. As noted previously, the input scope may be an individual input scope, a set of input scopes, a regular expression defining an input scope, or a list of words or phrases. Application of the input scope by the recognizer may restrict the language model used to the type of text input expected by the executable code for the text field to achieve higher accuracy in recognition of the input.

Figure 6:
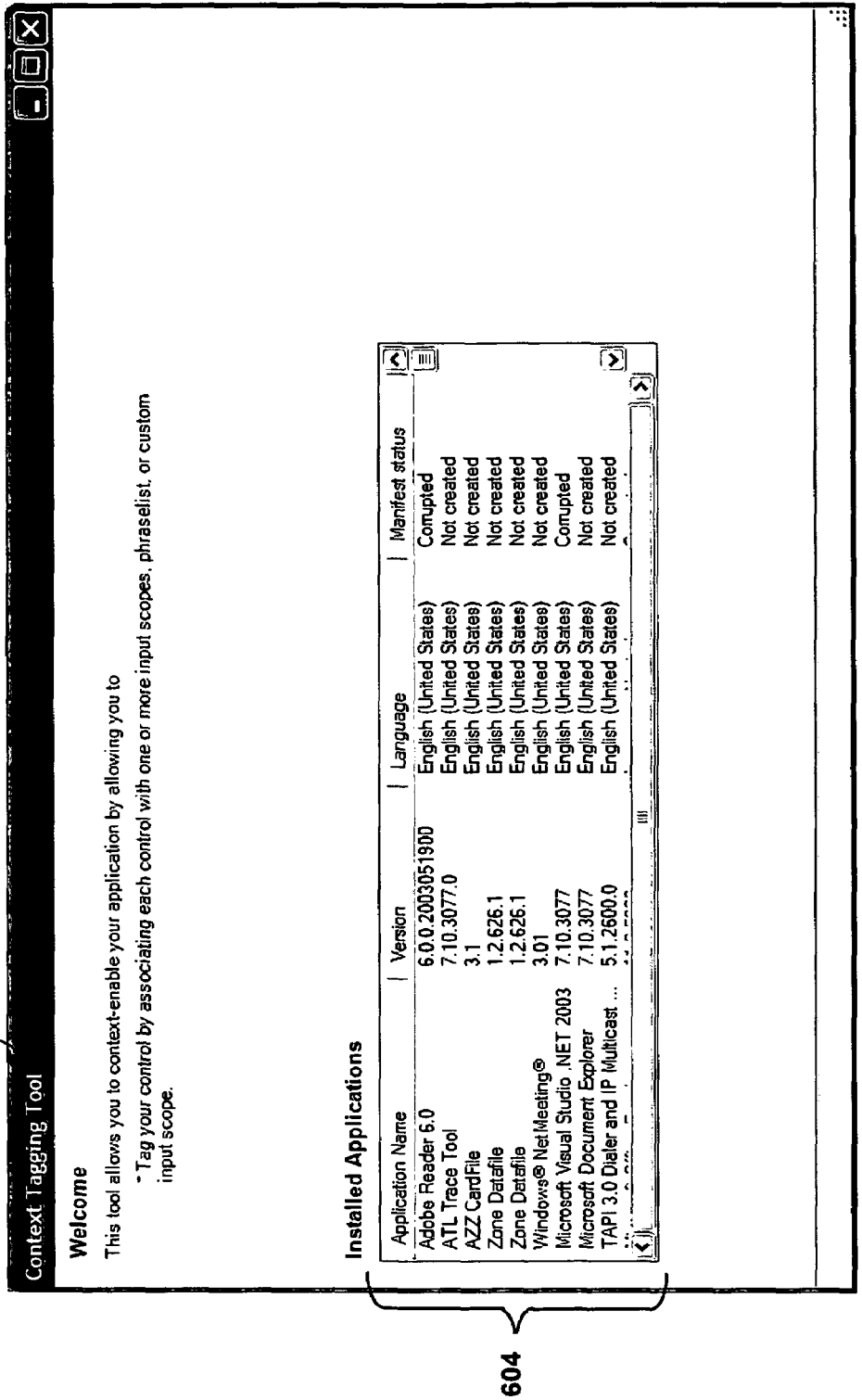
FIG. 6 is an exemplary illustration generally representing a screen of a graphical user interface of a context tagging utility for selecting an application or executable code, in accordance with an aspect of the present invention.

The context tagging tool 402 may include a user interface 404 for tagging text input fields or controls of an existing application or executable code with an input scope. FIG. 6 is an exemplary illustration generally representing an embodiment of a screen of the user interface 404 for selecting an application or executable code. The welcome screen 602 may include a scrollable list of installed applications or executable code 604 from which an application may be selected (by a touch pad or mouse or any other way) for tagging its text input fields or controls with an input scope.

Figure 7:
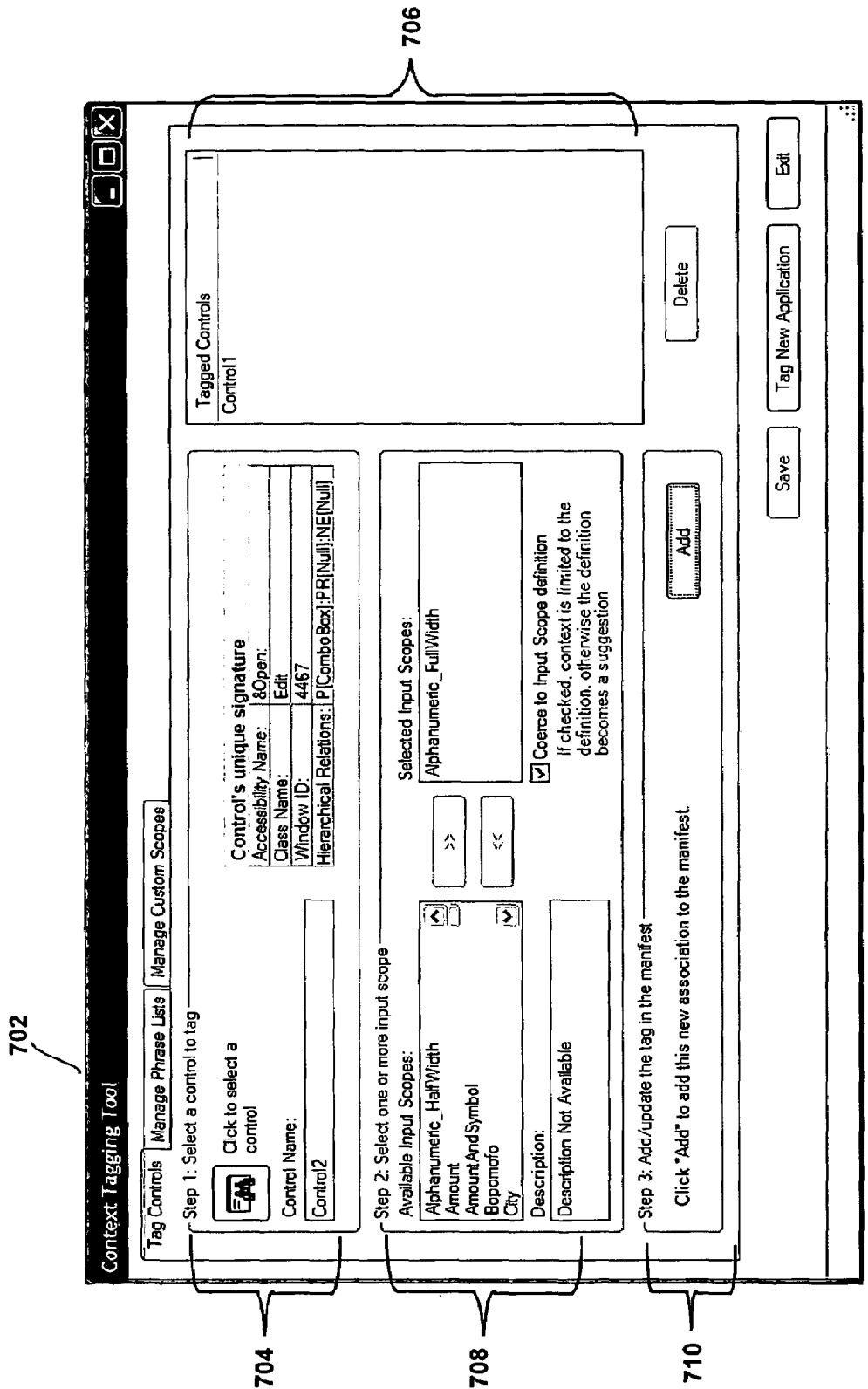
FIG. 7 is an exemplary illustration generally representing a screen of a graphical user interface of a context tagging utility for tagging a field or control with an input scope, in accordance with an aspect of the present invention.
Figure 8:
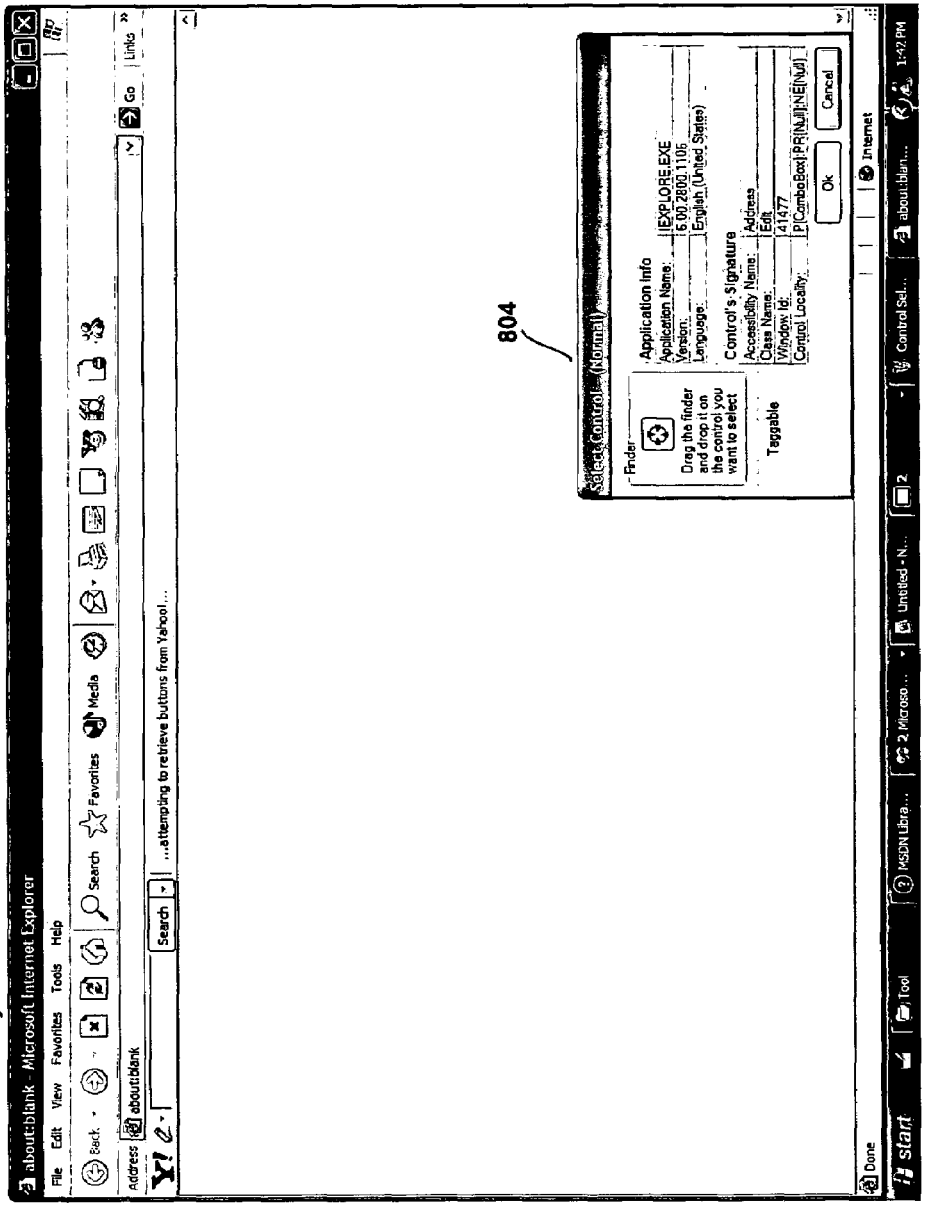
FIG. 8 is an exemplary illustration generally representing a screen of a graphical user interface of a context tagging tool for selecting a field or control, in accordance with an aspect of the present invention.

FIG. 7 is an exemplary illustration generally representing an embodiment of a screen of the user interface 404 for tagging a field or control with an input scope. The screen 702 labeled "Tag Controls" may generally include a display area 704 for selecting a control to tag. Upon activating a select control button as illustrated in display area 704 of the tag control screen 702, the select control screen 802 of FIG. 8 may be displayed. FIG. 8 is an exemplary illustration generally representing a screen of a graphical user interface of a context tagging tool for selecting a field or control. The select control screen 802 may include a display area 804 for viewing control information from the application selected in the welcome screen 602. A field or control may be marked for tagging via screen 802 by activating the "Ok" button in display area 804 to select a control or field.

Returning to the tag control screen 702 of FIG. 7, there is also shown a display area 708 for selecting one or more input scopes to be associated with the control or field previously selected in display area 704. Once the input scope has been selected and thereby associated with the previously selected control or field, the associated context tag may be added or updated in the manifest 410 by activating the "Add" button illustrated in display area 710. Controls or fields that have been added or updated in the manifest 410 may be listed in the display area 706 labeled "Tagged Controls".

Figure 9:
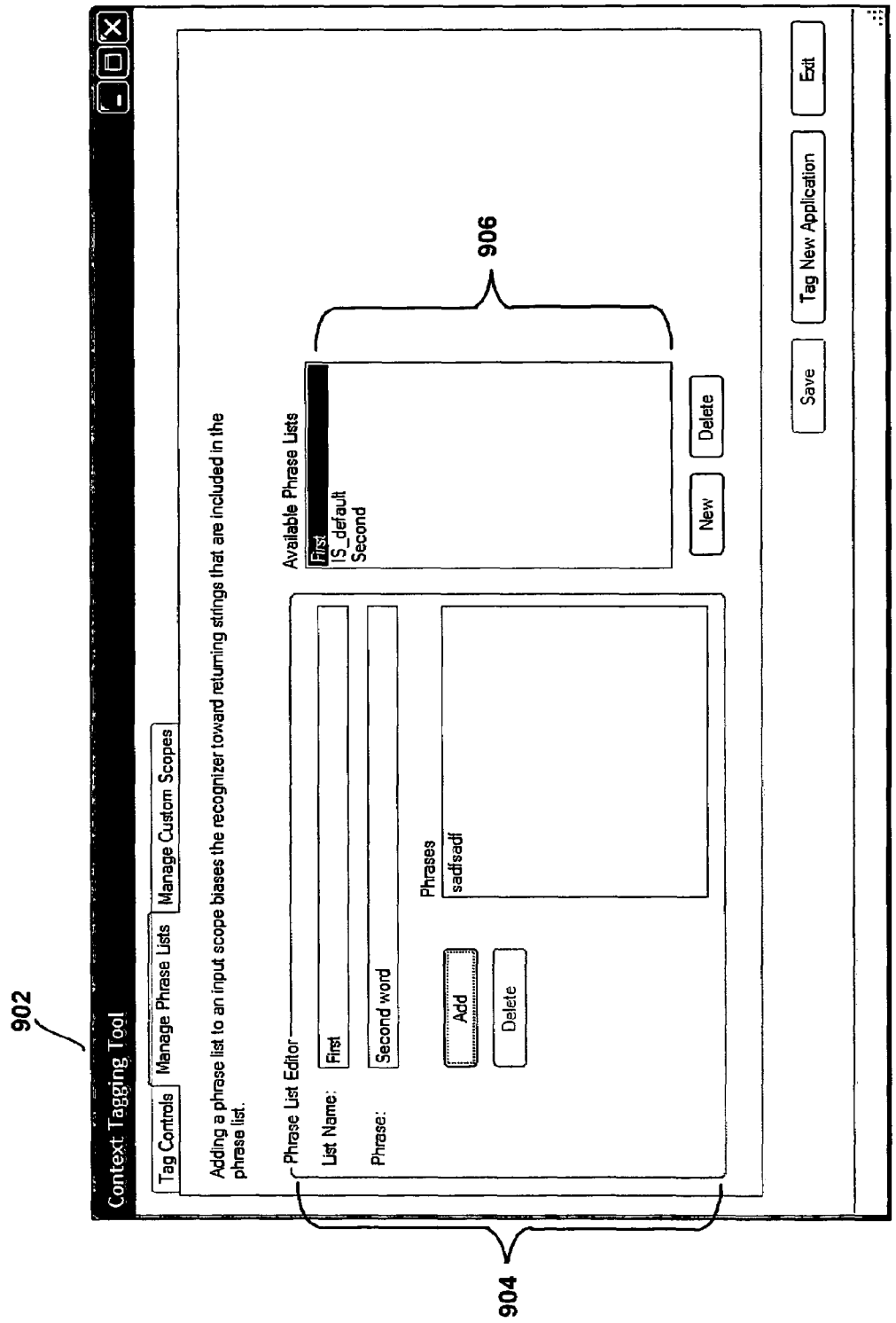
FIG. 9 is an exemplary illustration generally representing a screen of a graphical user interface of a context tagging tool for managing a phrase list, in accordance with an aspect of the present invention.
Figure 10:
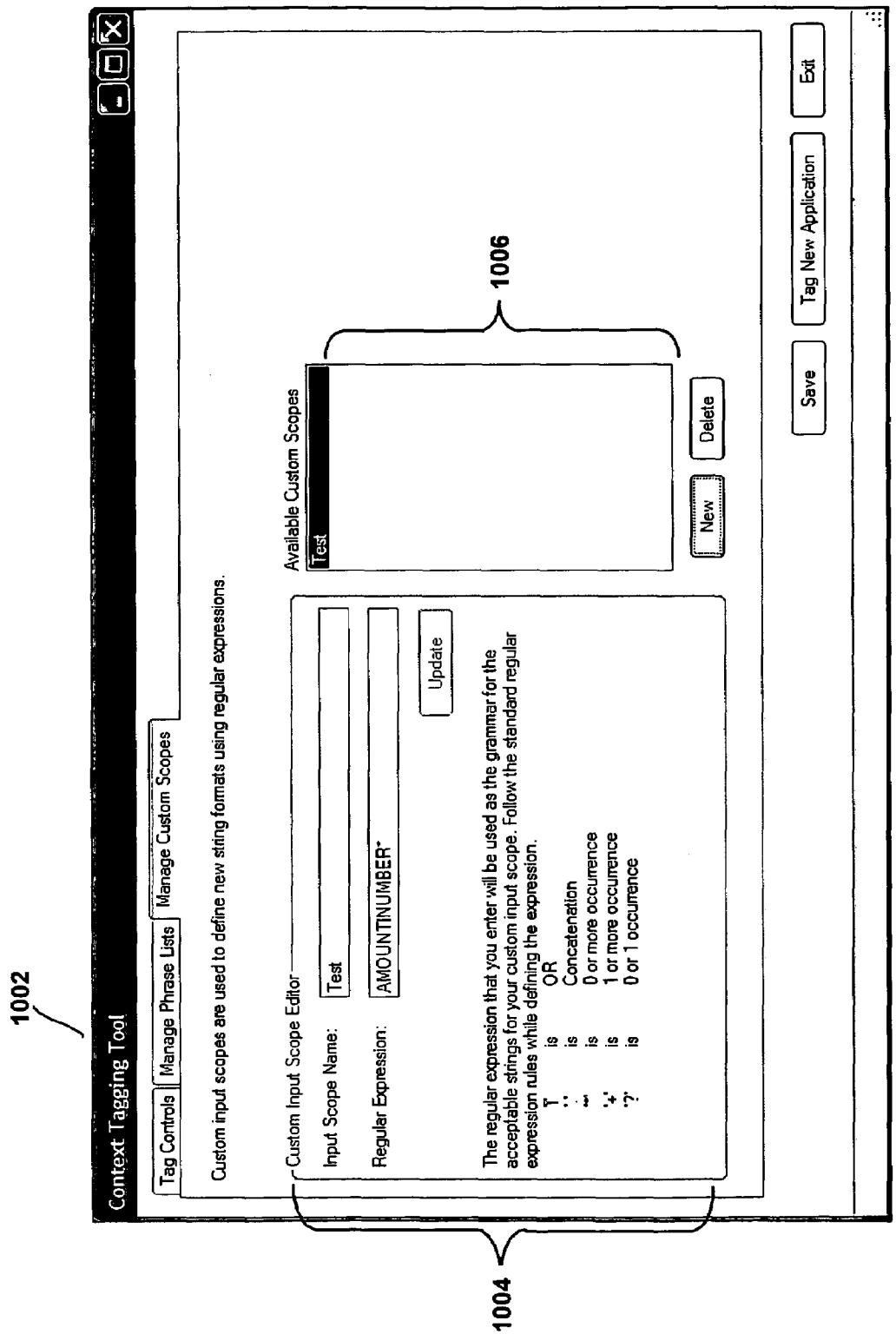
FIG. 10 is an exemplary illustration generally representing a screen of a graphical user interface of a context tagging tool for managing a custom scope, in accordance with an aspect of the present invention.

Additionally, the user interface 404 may include a phrase list editor as shown on the "Manage Phrase List" screen 902 of FIG. 9. FIG. 9 is an exemplary illustration generally representing a screen of a graphical user interface of a context tagging tool for managing a phrase list. A phrase list editor 904 may be used to create, edit and manage phrase lists that may be available as an input scope in display area 708 for a text input field or control. Available phrase lists may be displayed in display area 906 for convenience in deleting an existing phrase list or creating a new phrase list. Similarly, the user interface 404 may include a custom input scope editor as shown on the "Manage Custom Scopes" screen 1002 of FIG. 10. FIG. 10 is an exemplary illustration generally representing a screen of a graphical user interface of a context tagging tool for managing a custom scope. A custom input scope editor 1004 may be used to define, edit and manage custom input scopes that may be available as an input scope in display area 708 for a text input field or control. Available custom input scopes may be displayed in display area 1006 for convenience in deleting an existing custom input scope or creating a new custom input scope.

Advantageously, the user interface 404 of the context tagging tool described enables any executable code or application to benefit from use of the present invention for increasing accuracy of recognition without needing to modify the application or executable code itself. The present invention may be enhanced by any executable code or application such as real estate request forms, online registration forms, ecommerce order forms, online payment forms, and so forth. It provides a format for context information that may include a combination of input scopes, word lists, and regular expressions along with an interface for attaching it to a text input field of executable code.

As can be seen from the foregoing detailed description, the present invention provides an improved system and method for providing context information of executable code to an input method. The architecture of the present invention defines a common and unified context representation that applications may use to specify context properties for text input fields to improve the user experience for entry of text input via advanced input methods such as handwriting, speech, input method editors and so forth. The context information is extensible and developers can provide more detailed context constraints as desired. As is now understood, the present invention provides a framework with interfaces for supporting application authoring platforms to allow application developers to easily specify such context information to the system and have it reliably forwarded to the correct input methods. The method and system thus provide significant advantages and benefits needed in contemporary computing. Moreover, the present invention also provides a solution for providing context information of existing executable code or applications by using a context tagging tool that does not need to modify the executable code or applications. A manifest may be stored along with the program files and any advanced input methods used by the executable code or program may be updated with instructions for accessing the context information stored in the manifest.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for providing context information to an input method in order to enable advanced input methods to achieve a higher accuracy recognition rate for text input to application fields by providing a developer with interfaces that allow setting of pre-defined formats of input scope for different types of text input fields, the system comprising:
    a processor;
    a memory couple to the processor;
    a plurality of text input fields that receive a sequence of text characters;
    a manifest that stores context information for each of the plurality of text input fields, wherein the stored context information comprises a tag associating each of the plurality of text input fields with an input scope;
    a context tagging tool operably coupled to the plurality of text input fields, the context tagging tool having a control interface invocable by a user interface for setting an input scope for each of the plurality of text input fields and having a manifest interface for writing a mapping of each of the input scopes set for each of the plurality of text fields into the manifest, wherein an input scope is a subset of a language used to define what one or more words, numbers, or punctuations can be written and in what order they may be written to form a sequence of text characters in each of the plurality of text input fields, and wherein at least two input scopes set for each of the plurality of text input fields are different input scopes chosen from the following: a list of input scopes, a list of words or phrases, a common input scope, or a custom input scope;
    a context component operably coupled to the manifest, the context component having an application programming interface for retrieving the scope of input set for each of the plurality of text input fields from the manifest; and
    a recognizer for an input method, the recognizer operably coupled to the context component for invoking the application programming interface of the context component for receiving the scope of input retrieved for each of the plurality of text input fields from the manifest,
    wherein the manifest is created by the context tagging tool,
    wherein the context tagging tool associates specific text input fields of an existing application with an input scope without modifying the existing application itself, and
    wherein the user interface comprises a tag control editor for editing the input scope associated with the control interface.

2. The system of claim 1 wherein the control interface for setting an input scope for each of the plurality of text input fields comprises a parameter for passing the list of words.

3. The system of claim 1 wherein the control interface for setting an input scope for each of the plurality of text input fields comprises a parameter for passing the list of phrases.

4. The system of claim 1 wherein the control interface for setting an input scope for each of the plurality of text input fields comprises a parameter for passing the common input scope.

5. The system of claim 4 wherein the common input scope comprises a defined format with an associated fixed list of characters.

6. The system of claim 1 wherein the control interface for setting an input scope for each of the plurality of text input fields comprises a parameter for passing a regular expression.

7. The system of claim 1 wherein the control interface for setting an input scope for each of the plurality of text input fields comprises a parameter for passing the list of input scopes.

8. The system of claim 1 wherein the application programming interface of the context component for receiving the scope of input retrieved for each of the plurality of text input fields from the manifest comprises a method invoked for obtaining the list of input scopes.

9. The system of claim 1 wherein the application programming interface of the context component for receiving the scope of input retrieved for each of the plurality of text input fields from the manifest compnses a method invoked for obtaining the list of phrases.

10. The system of claim 1 wherein the application programming interface of the context component for receiving the scope of input retrieved for each of the plurality of text input fields from the manifest comprises a method invoked for obtaining the list of words.

11. The system of claim 1 wherein the application programming interface of the context component for receiving the scope of input retrieved for each of the plurality of text fields from the manifest comprises a method invoked for obtaining a regular expression.

12. The system of claim 1 wherein the recognizer comprises a recognizer for speech.

13. The system of claim 1 wherein the recognizer comprises a recognizer for handwriting.

14. The system of claim 1 wherein the recognizer comprises a recognizer for an input method editor.

15. The system of claim 1 wherein the user interface comprises a phrase list editor for editing the list of phrases.

16. The system of claim 1 wherein the user interface comprises a custom input scope editor for editing the custom input scope.

17. The system of claim 1 wherein the manifest comprises an XML file.

18. A computer-readable storage medium having computer-executable components comprising the system of claim 1.

* * * * *